United States Patent [19]

Sheilds et al.

[11] E Patent Number: Re. 32,042

[45] Reissued Date of Patent: Dec. 3, 1985

[54] STATOR BLADE ASSEMBLY FOR TURBO MACHINES

[75] Inventors: J. Rodger Sheilds, Pittsburgh; Alexander A. Carroll, Greensburg, both of Pa.

[73] Assignee: Elliott Turbomachinery Company, Inc., Jeannette, Pa.

[21] Appl. No.: 71,621

[22] Filed: Aug. 31, 1979

Related U.S. Patent Documents

Reissue of:

[64] Patent No.: 3,887,976
Issued: Jun. 10, 1975
Appl. No.: 335,973
Filed: Feb. 26, 1973

U.S. Applications:

[62] Division of Ser. No. 112,163, Feb. 3, 1971, abandoned.

[51] Int. Cl.[4] ..... B21K 3/00

[52] U.S. Cl. ..... 29/156.8 R; 415/217; 415/219 R; 29/446

[58] Field of Search ..... 29/156.8 R, 446, 23.5, 29/451, 452, 455 R, 225, 230, 256, 282; 415/217, 218, 219

[56] References Cited

U.S. PATENT DOCUMENTS

| | | | |
|---|---|---|---|
| Re. 12,317 | 2/1905 | Fullager | 29/158.8 R |
| 839,243 | 12/1906 | Wilkinson | 29/156.8 R |
| 1,158,755 | 11/1915 | Weaver | 29/156.8 R |
| 1,621,002 | 3/1927 | Dimberg | 29/156.8 R |
| 2,357,139 | 8/1944 | Seme | 29/451 |
| 2,640,679 | 6/1953 | Wheatley et al. | 415/217 |
| 2,856,118 | 10/1958 | Smith | 415/217 |
| 2,931,412 | 4/1960 | Wing | 29/451 |
| 3,071,853 | 1/1963 | Price et al. | 228/181 |
| 3,108,783 | 10/1963 | Foust et al. | 29/256 |

FOREIGN PATENT DOCUMENTS

| | | | |
|---|---|---|---|
| 1403024 | 11/1968 | Fed. Rep. of Germany | 29/156.8 R |
| 1382178 | 11/1964 | France | 29/448 |
| 24833 | 11/1967 | Japan | 29/446 |
| 15893 | of 1908 | United Kingdom | 415/217 |

*Primary Examiner*—Daniel C. Crane
*Attorney, Agent, or Firm*—Robert P. Hayter

[57] ABSTRACT

The stator blades of a stage of an axial flow turbo machine are assembled in an arcuate series, as by insertion of the journals at the outer ends of the blades in the stator housing. A one-piece arcuate inner shroud ring is formed with aperture spaced circumferentially comparable to the spacing of the inner ends of the blades in the series. The diameter of the apertures exceeds the diameter of the blade journals. Force is applied to the ends of the ring to control or bow the same sufficiently to permit insertion of the contracted ring into the series of blades. Upon insertion of the ring, the contracting force is relieved, permitting the ring to expand to normal contour whereby the inner journals of the blades become positioned in the apertures of the ring. Thereafter annular bearings are inserted in the space between the journals and the bores of the apertures.

5 Claims, 4 Drawing Figures

STATOR BLADE ASSEMBLY FOR TURBO MACHINES

Matter enclosed in heavy brackets [ ] appears in the original patent but forms no part of this reissue specification; matter printed in italics indicates the additions made by reissue.

This is a division, of application Ser. No. 112,163 filed Feb. 3, 1971, now abandoned.

BACKGROUND OF THE INVENTION

In some types of multi-stage axial flow turbo machines, the stator blades are fixedly mounted in the stator housing by locking the tangs, or journals, at the outer ends of the blades to the stator housing. In large high speed machines, the stator blades are subjected to forces of substantial magnitude tending to create a vibratory condition in the blades. To reduce such vibration, inner shroud rings have been fixedly secured to the inner ends of the fixed blades: for example, as shown in U.S. Pat. No. 3,269,701, assigned to the assignee herein.

In turbo machines for certain applications, it is desirable to mount at least one row of the stator blades for rotative adjustment about their lengthwise axis. To eliminate excessive vibration in the adjustable blades, it is necessary to provide a relatively close running fit between the blade journals and stator housing and the inner shroud ring. In view of the mounting of the blades for rotation, problems are encountered in the manufacture and assembly of the inner shroud rings to the blades to provide the proper support thereof, and to provide free adjustment of the blades under operating conditions.

This invention has as an object a stator blade assembly structure wherein the inner shroud ring is of simple one-piece construction, economical to manufacture and which is quickly and conveniently mounted on the inner ends of an arcuate series of stator blades.

SUMMARY OF THE INVENTION

The stator blades of a stage are arranged in an arcuate series, which arrangement can be had by inserting the journals at the outer ends of the blades in apertures formed in the stator housing, and a one-piece shroud ring of arcuate configuration is formed with oversized apertures to receive projections at the inner ends of the circular series of blades. The ring is applied to the blades of the series by being contracted to reduce the chord dimension of the ring sufficient to clear the inner ends of the blades when the ring is inserted in the series. Upon release of the contraction force, the ring expands to its normal contour, moving the apertures of the ring over the journals at the inner ends of the blades. With the ring so positioned, in the arcuate series of stator blades, annular bearing members are inserted in the apertures and have a close running fit with the ends of the blades. The bearings are locked in the apertures.

DESCRIPTION OF THE PREFERRED EMBODIMENT

Figure 2:
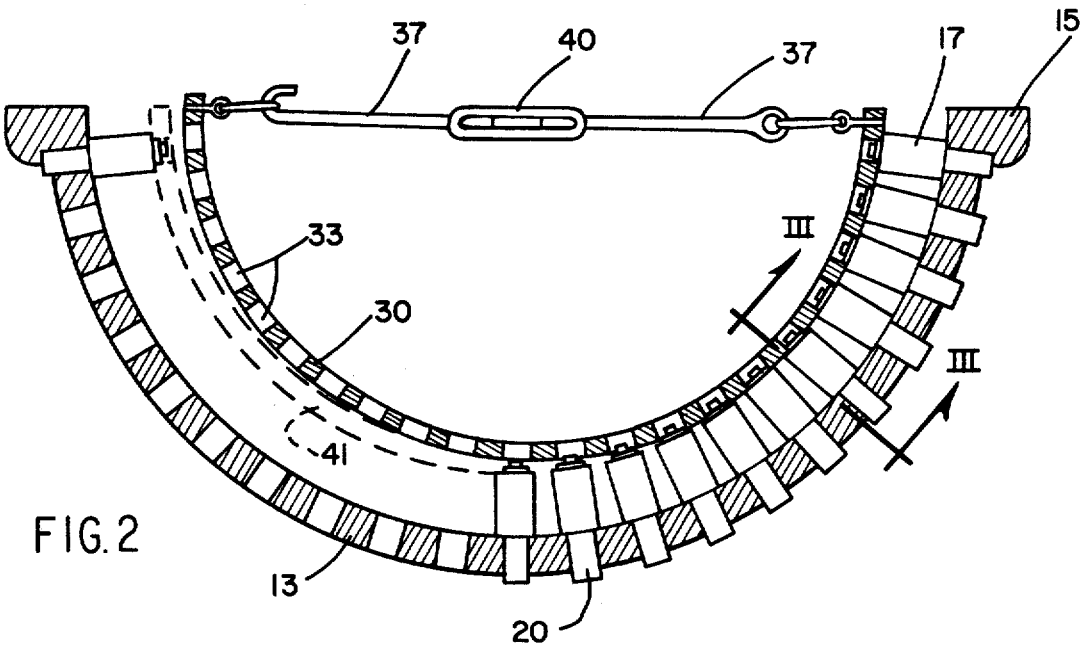
FIG. 2 is a view similar to FIG. 1 showing the shroud ring inserted farther in the series of blades.
Figure 3:
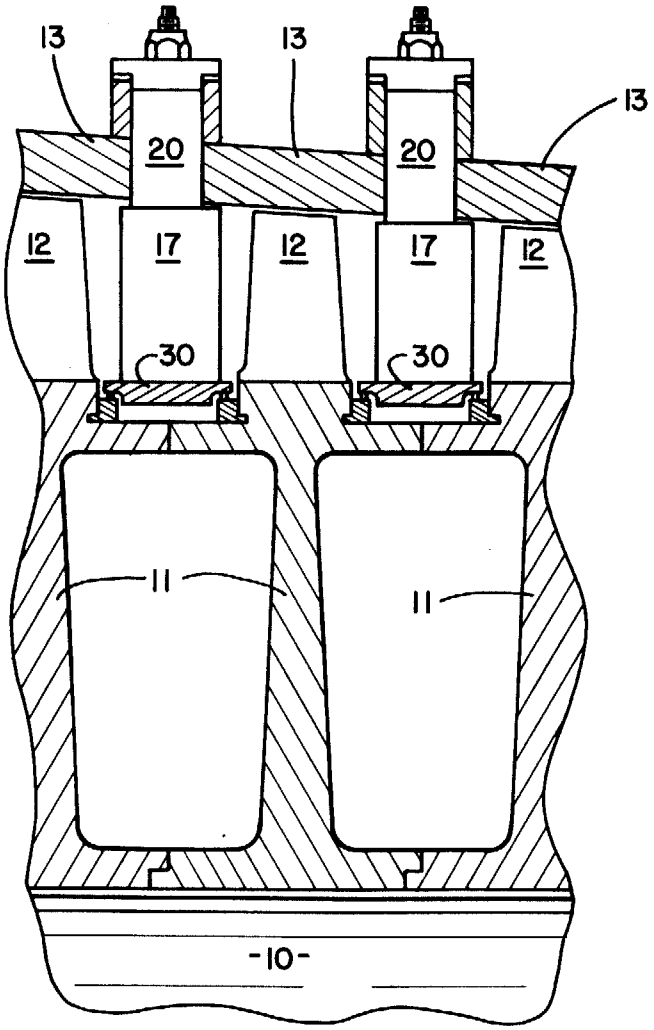
FIG. 3 is an enlarged view taken on line III—III of FIG. 2.

Referring to the fragmentary sectional view of FIG. 3, the shaft structure of the turbo machine is designated 10, and has affixed to it a series of axially arranged discs 11. Each disc 11 carries a circular series of rotor blades 12, there being a disc and series of blades 12 for each stage of the machine. The blades 12 are encircled by a stator housing 13 which conventionally consists of two semi-circular sections having side bosses 15 bolted together, FIGS. 1 and 2.

A circular series of stator blades 17 is mounted intermediate each series of spaced rotating blades 12. The blades 17 are provided at their outer ends with projections in the form of tangs 20, which extend outwardly through apertures formed in the stator housing 13.

Figure 4:
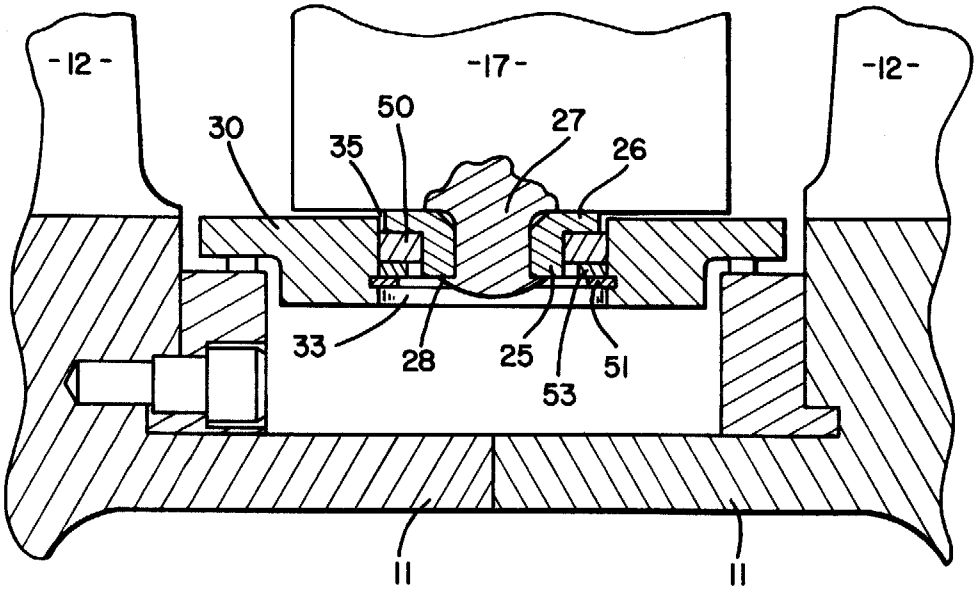
FIG. 4 is an enlarged sectional view of the inner shroud ring and blade journal structure shown in FIG. 3.

The inner ends of the stator blades 17 are provided with projections or journals, which may be formed integral with the blades, or as shown in FIG. 4, may consist of annular collar members 25 positioned on a tang portion 27, the outer end of which is headed over as shown at 28 to fixedly secure the collars 25 to the blades 17. Preferably the journals 25 are formed with radial flanges 26 abutting against the inner end of the blade.

A one-piece shroud ring section 30, shown in the preferred embodiment as being of semi-circular form, is provided with a series of apertures 33 spaced circumferentially along the ring comparable to the spacing of the inner ends of the blades 17. These apertures have a bore somewhat larger than the diameter of the collars 25 as indicated by the annular space 35, FIG. 4, encircling the periphery of the collar 25. These apertures are dimensioned so that upon [applying a contracting force inwardly on the] *connecting opposed* ends of the ring 30, as by rods 37 and turnbuckle 40, FIGS. 1 and 2, *and applying a contracting force inwardly on these ends of the ring by retracting rods 37, the ends of the shroud ring are forced inward toward each other and* the ring is deflected to reduce the chordal dimension thereof sufficiently within its elastic limit, to permit the contracted ring to be inserted in the circular series, of blades 17, mounted in the half of the stator housing 13.

Figure 1:
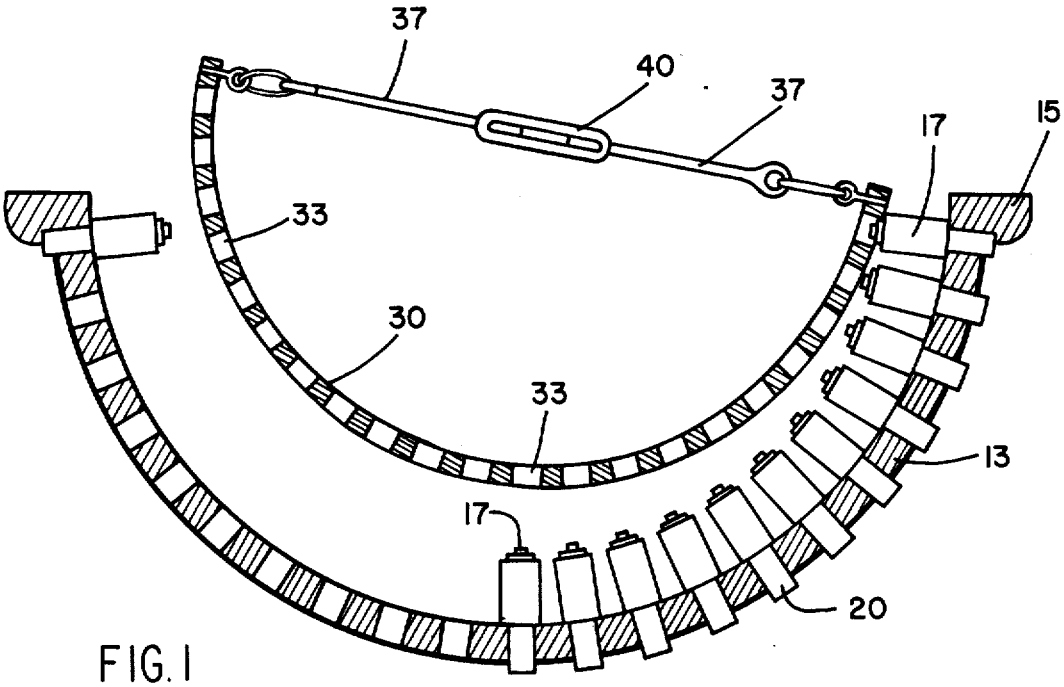
FIG. 1 is a schematic illustration showing a preferred embodiment of the invention wherein the blades of a stage of the machine are arranged in an arcuate series in the stator housing, and illustrating the inner shroud ring in contracted form positioned for insertion in the series of blades, the housing and shroud ring being illustrated in sections.

Referring to FIG. 1, the aperture in the contracted ring 30, adjacent one end thereof, is placed over the journal of the blade 17 at the corresponding end of the series of blades. The ring is then rocked downwardly whereby the journals of the blades successively enter the apertures of the ring. In FIG. 2, the ring 30 has been rocked downwardly to a position where the journal of the blade at the center of the series is about to enter the corresponding aperture in the ring. The turnbuckle 40 is then released *allowing rods 37 to extend and* permitting the ring to expand to normal contour, whereby the journals of the remaining blades 17 in the series enter the remaining apertures in the ring. The expanded ring being indicated by dotted outline 41, FIG. 2.

Annular bearing members 50 are then inserted in the space between the periphery of each collar 25 and the bore of the aperture 33. The bearings have a snug fit with the bore in the apertures, and a close running fit with the collars 25. The bores of the apertures are formed with circular grooves to receive snap rings 51, FIG. 4. Thrust washers 53 are positioned between the snap ring and the bearings 50. With this arrangement, the bearings are detachably interlocked with the ring 30, and a thrust structure is provided for the journaled stator blades 17. Because of the structure and mounting method described, the inner shroud rings 30 are economically produced by a turning operation, and are completed by the drilling and grooving of the apertures 33. The rings may be formed circular and subsequently split to provide the two integral semi-circular sections for use in each stage of the machine. This one-piece formation of the shroud ring greatly reduces the time and effort in the assembly of the shroud rings in the machine.

The stator housing 13, illustrated in FIGS. 1 and 2, may be the half section of the housing associated with the bottom half of the machine casing. After the stator blades 17 have been assembled in the stator housing for each stage, and the ring 30 attached to the inner ends of the blades, the rotor assembly is lowered into the machine.

The upper half of the machine casing is then supplied with the stator blades, and the shroud rings 30 applied to those blades in like manner. That assembly is then inverted and placed upon the lower half of the casing and affixed thereto. It will be apparent that our invention provides adequate support for the journaled stator blades, and also materially reduces the time and expense in the assembly of the machine.

It will be noted that the shroud ring assembly structure of our invention permits the shroud ring to be formed in two semi-circular sections which are manufactured at low cost and are easily and quickly assembled in the machine. In addition, the construction serving as the subject matter of this invention provides a more reliable structure than in previous shroud ring constructions, as for example, the two-piece bolted sections adapted to clamp the inward projecting ends of the stator blades at opposite sides thereof as disclosed in U.S. Pat. No. 3,269,701.

While we have described a preferred embodiment of our invention, it is to be understood that the invention is not limited thereto, but may be otherwise embodied within the scope of the following claims.

We claim:

1. The method of assembling an arcuate shroud ring to the inner ends of an arcuate series of stator blades extending in a radial direction inwardly from a machine casing, the ring having apertures spaced apart circumferentially for receiving in registration therewith said blade ends, the method including contracting the shroud ring by [applying a force thereto] *connecting an extensible rod to opposed ends thereof and retracting the rod* to reduce the diameter of the shroud ring to a diameter less than that described by the ends of the blades in the series whereby at least one blade receiving aperture in the ring is insertable into one of said blade ends, inserting said one aperture into said one blade end, and

[relieving said contracting force to permit] *extending the rod to expand* the shroud ring [to expand] *to a normal contour and* whereby the remaining apertures move into receiving registration with the remaining blade ends in said series.

2. The method of claim 1 wherein said one blade end is carried on the last blade in said series.

3. The method of claim 2 wherein the shroud ring is semi-circular in form.

*4. The method of claim 1 further including the step of fixing a bearing in each aperture in the shroud ring after the apertures have moved into registration with the blade ends to secure the blades against axial displacement.*

*5. The method of claim 4 wherein the relieving step includes the steps of rocking the shroud ring downward while contracted whereby a plurality of blade ends successively enter ring apertures, and then relieving the contracting force whereby the shroud ring expands to the normal contour and the remaining shroud ring apertures move into receiving registration with the remaining blade ends.*

* * * * *